United States Patent
Wang (10) Patent No.: US 9,577,508 B2
(45) Date of Patent: Feb. 21, 2017

(54) NMOS LDO PSRR IMPROVEMENT USING POWER SUPPLY NOISE CANCELLATION

(71) Applicant: Texas Instruments Incorporated, Dallas, TX (US)

(72) Inventor: Jianbao Wang, Tucson, AZ (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 668 days.

(21) Appl. No.: 13/894,589

(22) Filed: May 15, 2013

(65) Prior Publication Data

US 2014/0340058 A1 Nov. 20, 2014

(51) Int. Cl.
H02M 3/158 (2006.01)
H02M 1/15 (2006.01)
G05F 1/575 (2006.01)
H02M 1/00 (2006.01)

(52) U.S. Cl.
CPC .............. H02M 1/15 (2013.01); G05F 1/575 (2013.01); H02M 2001/0022 (2013.01)

(58) Field of Classification Search
None
See application file for complete search history.

(56) References Cited

U.S. PATENT DOCUMENTS

| | | | |
|---|---|---|---|
| 5,264,780 A * | 11/1993 | Bruer | H02M 1/4225 323/222 |
| 5,929,692 A * | 7/1999 | Carsten | H02M 1/15 323/271 |
| 2003/0111986 A1* | 6/2003 | Xi | G05F 1/575 323/280 |
| 2008/0169795 A1* | 7/2008 | Wang | G05F 1/575 323/280 |
| 2011/0193540 A1 | 8/2011 | Dasgupta | |
| 2012/0133838 A1* | 5/2012 | Mabuchi | H04N 5/18 348/691 |
| 2012/0146595 A1 | 6/2012 | Wong | |

* cited by examiner

Primary Examiner — Timothy J Dole
Assistant Examiner — Monica Mata
(74) Attorney, Agent, or Firm — William B. Kempler; Charles A. Brill; Frank D. Cimino (57) ABSTRACT

Power-supply ripple rejection (PSRR) at high frequencies is improved for an LDO voltage regulator with an NMOS pass transistor (MN1). A ripple voltage ($V_{ripple}$) present on the input voltage causes a ripple current ($I_{ripple}$) through parasitic gate-drain capacitance of the pass transistor. A small ripple current ($I_{fraction}$) proportional to the ripple current ($I_{ripple}$) is generated and amplified to generate a cancellation current ($I_{cancel}$). The cancellation current is drawn from the gate of NMOS pass transistor (MN1) to cancel the ripple current so that no net ripple current flows through the finite output impedance of an error amplifier (2), to thereby achieve the PSRR improvement.

19 Claims, 6 Drawing Sheets

NMOS LDO PSRR IMPROVEMENT USING POWER SUPPLY NOISE CANCELLATION

BACKGROUND OF THE INVENTION

The present invention relates generally to LDO (low dropout) voltage regulators, and more particularly to improvements in LDO voltage regulators which utilize an N-channel pass transistor and also provide both high PSRR (power supply rejection ratio, also referred to as power supply ripple rejection) and low $V_{IN}$-to-$V_{OUT}$ voltage "headroom" at high frequencies. A conventional LDO, with either an NMOS or a PMOS pass device, is essentially a 3-terminal device having $V_{IN}$, $V_{OUT}$, and GND terminals. $V_{IN}$ not only delivers power to $V_{OUT}$, but also is used as a supply voltage, sometimes referred to as a "supply rail", for the LDO control circuit. In the case of N-channel pass transistor LDO, $V_{IN}$ can no longer be used as the supply rail for controlling the gate of an N-channel pass transistor of an LDO as $V_{IN}$-to-$V_{OUT}$ becomes lower and lower (to be less than 0.7 volts), because N-channel MOS transistors need at least one gate-to-source (VGS) voltage, typically around 0.7 volts, to be turned on. That is why a separate voltage rail higher than $V_{IN}$, either an external biasing rail $V_{DD}$ or an internally generated charge-pump voltage $V_{CP}$, must be used to provide the gate drive for an N-channel MOS pass transistor. The penalties of using an external biasing voltage rail include limited use of N-channel pass transistor LDO's to systems where an extra high voltage rail is available and increased system complexity. The penalties for using an on-chip charge pump needed for N-channel LDO pass transistors include introducing switching noise and increasing the cost for integrated circuit die area. Nevertheless, the need to regulate from low input voltages makes it even more desirable to use N-channel MOS pass transistors in LDO voltage regulators because an N-channel MOS pass transistor can provide a lower dropout voltage (i.e., the $V_{IN}$-to-$V_{OUT}$ voltage headroom) than a P-channel pass transistor due to the higher mobility of the charge carriers in N-channel transistors. In other words, the higher mobility charge carriers allow N-channel pass transistors to be substantially smaller and therefore less costly than P-channel pass transistors.

It has been very challenging to obtain high PSRR in voltage regulators having low dropout voltages because there is a trade-off between achieving high PSRR and reducing the size of the pass transistor. The PSRR for a linear regulator is defined as PSRR=vi(s)/vo(s), where vi(s) is the small AC excitation signal on $V_{IN}$ and vo(s) is the AC responsive signal on $V_{OUT}$. For a given amount of dropout voltage or $V_{IN}$-to-$V_{OUT}$ headroom, a larger MOS pass transistor operates closer to its saturation region and consequently provides better isolation of its regulated output voltage $V_{OUT}$ from ripple voltage components in its input voltage $V_{IN}$. (By way of definition, the terms "ripple voltage" and "noise voltage" as used herein have generally the same meaning.)

Figure 1A:
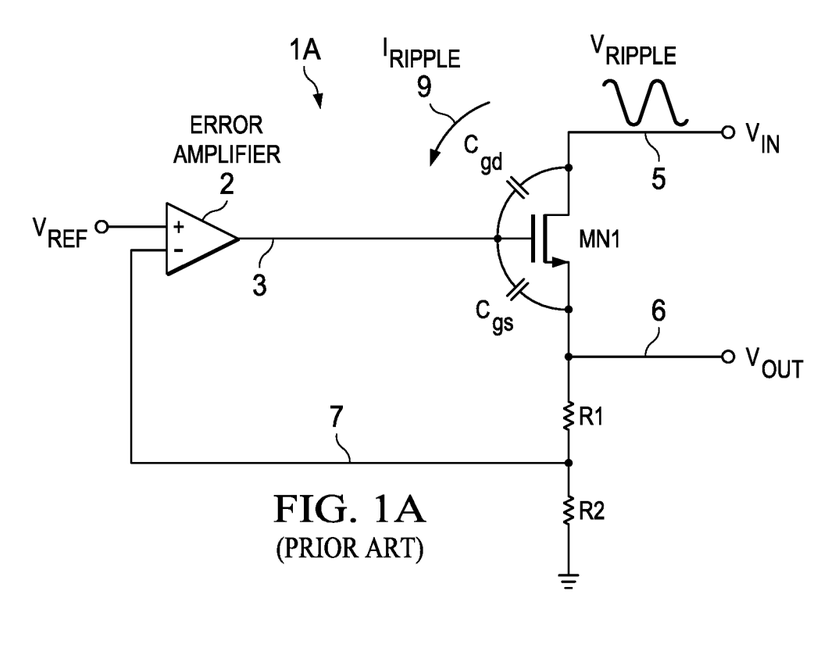
FIG. 1A is a schematic diagram of a conventional LDO voltage regulator utilizing a N-channel pass transistor.

Referring to Prior Art FIG. 1A, a typical low-dropout LDO voltage regulator 1A includes an error amplifier 2 and a large N-channel pass transistor MN1. The (+) input of error amplifier 2 is coupled to a reference voltage $V_{REF}$, which is typically generated by a conventional band gap reference voltage circuit. A resistive voltage divider circuit including resistors R1 and R2 feeds a divided-down portion of the regulated output voltage $V_{OUT}$ back to the (−) input of error amplifier 2. The output of error amplifier 2 is coupled by conductor 3 to drive the gate of N-channel pass transistor MN1 acting as a source follower. Since the physical size of the N-channel pass transistor MN1 is relatively large, its gate-to-drain parasitic capacitance Cgd also is proportionately large, so the AC voltage component of the input voltage $V_{IN}$ can inject significant "displacement current" through the parasitic capacitance Cgd to the gate of pass transistor MN1, as indicated by arrow 9 in FIG. 1A. Since error amplifier 2 has finite output impedance $r_o$, the injected displacement current generates a noisy ripple voltage related to the input ripple voltage on the gate of pass transistor MN1 (except for some phase shifts). Because of the source follower operation of pass transistor MN1, a "replica" of the noisy ripple voltage on the gate of pass transistor MN1 is passed onto $V_{OUT}$ conductor 6 as a corresponding ripple voltage component of $V_{OUT}$. This degrades the PSRR of LDO voltage regulator 1.

Figure 1B:
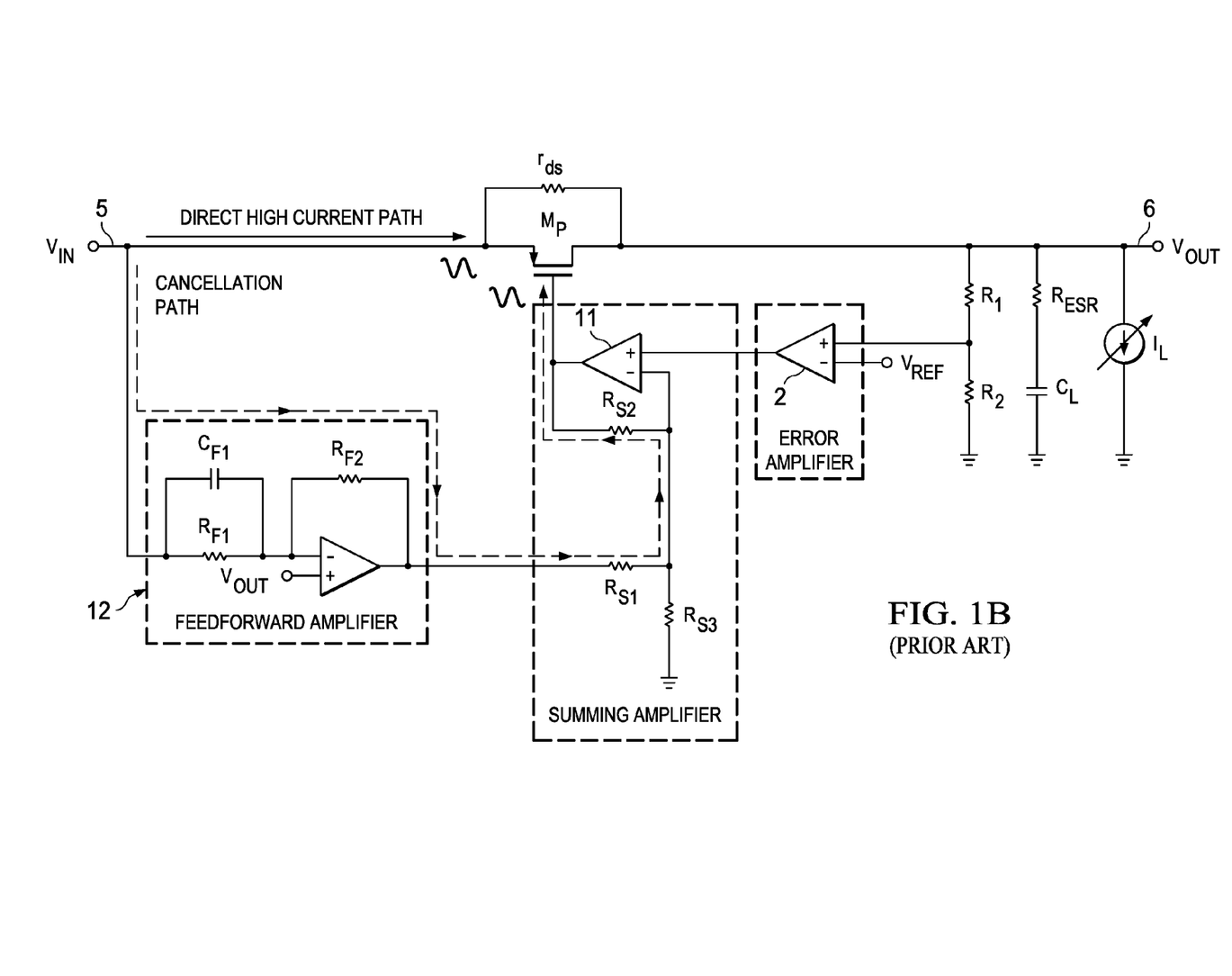
FIG. 1B is a schematic diagram of a conventional LDO voltage regulator utilizing a P-channel pass transistor and a feedforward amplifier.

FIG. 1B is a copy of a CMOS (complementary metal oxide semiconductor) LDO voltage regulator 1B shown in the reference "A 25 mA 0.13 μm CMOS LDO Regulator with Power-Supply Rejection Better than −56 dB up to 10 MHz Using a Feedforward Ripple-Cancellation Technique", by Mohamed El-Nozhi et al., ISSCC Digest of Technical Papers, pp. 330-331, February, 2009. The basic idea of this reference is to use ripple cancellation to improve the PSRR of a LDO voltage regulator that uses a P-channel pass transistor MP. In FIG. 1B, one can see that $V_{IN}$ drives the source of P-channel pass transistor MP and any ripple voltage in the VGS (gate-to-source-voltage) will be converted into ripple current to $V_{OUT}$, causing PSRR degradation. By using a feed-forward amplifier 12 to duplicate the ripple noise component of $V_{IN}$ onto the gate of the P-channel pass transistor MP, the P-channel pass transistor MP does not "see" any ripple voltage component of $V_{IN}$ between its gate and source, so the PSRR is improved.

It can be seen that input ripple voltage cancellation for the LDO regulator of FIG. 1B can only be obtained within the bandwidths of the feed-forward amplifier 12 and summing amplifier 11, as the high frequency components in the input ripple voltage that are beyond the bandwidths of the two amplifiers can not be replicated to the gate of pass transistor MP. Moreover, in order to obtain optimal ripple voltage cancellation, pass device MP has to operate in its saturation region, as the cancellation is based on nullifying the ripple voltage superimposed on the gate-to-source voltage VGS of pass transistor MP so that no input ripple voltage can be converted to a ripple current flowing to the regulator output to cause PSRR degradation. However, as previously indicated, the pass transistor in an LDO voltage regulator usually operates in or near its linear region to improve power efficiency. If pass transistor MP in FIG. 1B is operating in its linear region, not only the output conductance of the pass transistor, $g_{ds}$, can be comparable to, or even larger than, its transconductance $g_m$, but the output conductance also changes substantially with the load of the LDO regulator. The cancellation is not so effective because most of the noise coupled from $V_{IN}$ to $V_{OUT}$ passes through the output conductance $g_{ds}$ of pass transistor MP. Also, it should be noted that although the cancellation technique of prior art FIG. 1B is effective for a P-channel pass transistor LDO, it is not applicable for an N-channel pass transistor LDO.

Figure 1C:
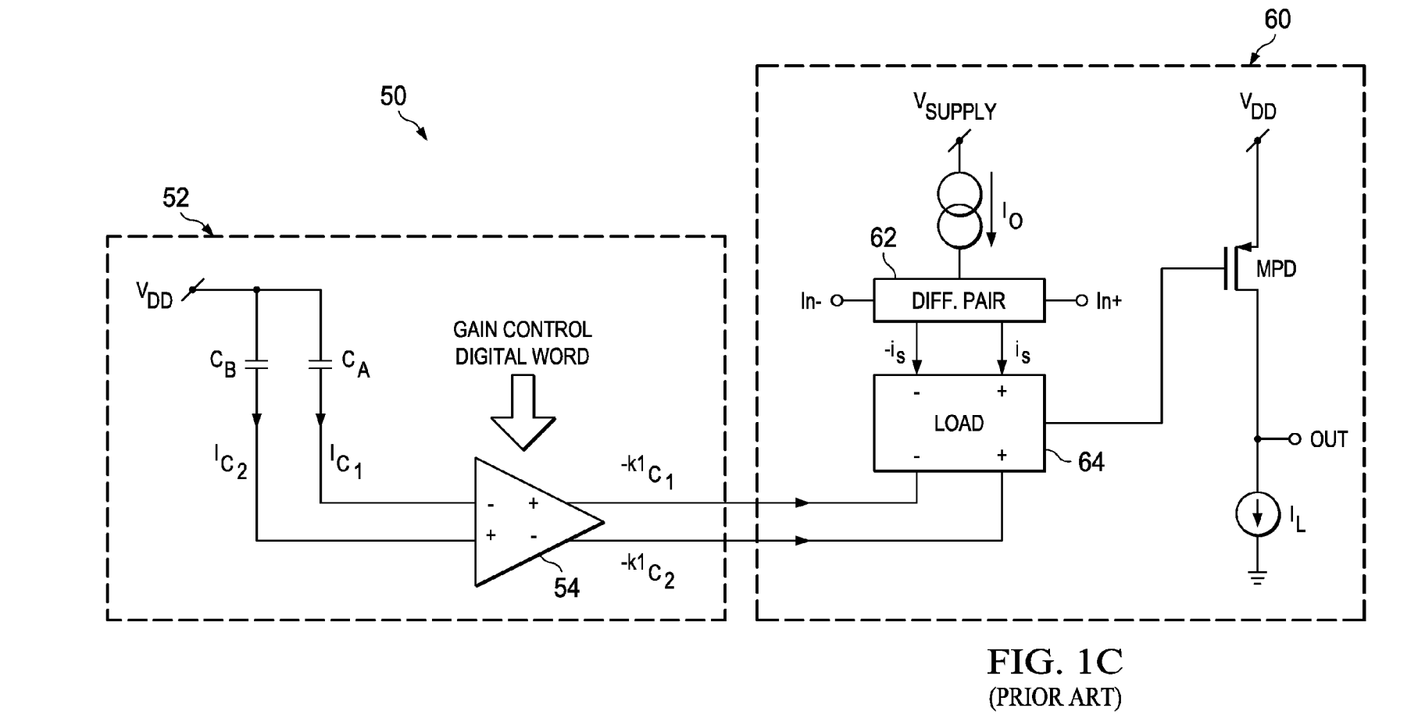
FIG. 1C is a schematic diagram of another conventional LDO voltage regulator utilizing a P-channel pass transistor and an amplifier with power supply ripple cancellation circuitry.

FIG. 1C is a copy of a CMOS LDO voltage regulator 50 shown in US Published Patent Application Pub. No. US2011/0193540 entitled "Enhancement of Power Supply Rejection for Operational Amplifiers and Voltage Regulators", by Uday Dasgupta, filed Feb. 11, 2010 and published Aug. 11, 2011. This reference describes the implementation of PSRR improvement in an intermediate frequency range using feed-forward power supply ripple cancellation. A differential transistor pair 62 drives a load 64 to control the P-channel pass transistor MPD, in a conventional LDO. In addition, an amplifier 52 also drives load 64 to generate a feed-forward path for the power supply noise signal to cancel a power supply ripple voltage signal present on the gate of the pass transistor MPD. The cancellation is completed if the two signals are exactly equal and opposite. In this reference, the cancellation is optimized by digitally modifying the PSRR transfer function. Current signals resulting from the power supply ripple voltage are injected into a first stage to cancel first order terms in the PSRR transfer function, and a digital current gain adjustment circuit is used to optimize the PSRR, which occurs mainly within the bandwidth of the feedback loop. Similarly to the prior art shown in FIG. 1B, the effectiveness of the PSRR cancellation in Prior Art FIG. 1C is reduced when the operation of P-channel pass transistor MPD is near or in its linear operating region. Furthermore, the disclosed technique is not applicable to an N-channel pass transistor.

Thus, there is an unmet need for an LDO voltage regulator having an N-channel pass transistor, and also having substantially higher PSRR at higher frequencies than the closest prior art.

There also is an unmet need for an LDO voltage regulator having an N-channel pass transistor, and also having substantially higher PSRR at higher frequencies than the closest prior art irrespective of whether the pass transistor is operating near or in its linear region.

SUMMARY OF THE INVENTION

It is an object of the invention to provide an LDO voltage regulator having an N-channel pass transistor, and also having substantially higher PSRR at high frequencies than the closest prior art.

It is another object of the invention to provide an LDO voltage regulator having an N-channel pass transistor, and also having substantially higher PSRR at high frequencies than the closest prior art irrespective of whether the pass transistor is operating near or in its linear region.

Briefly described, and in accordance with one embodiment, the effect of ripple voltage present on an input voltage ($V_{IN}$) is canceled from a regulated output voltage ($V_{OUT}$) of a low dropout voltage regulator including an error amplifier (2) and an N-channel pass transistor (MN1) coupled between the supply voltage and the regulated output voltage and having a gate coupled to the error amplifier output (15), an input (−) of which is coupled by a feedback path to the regulated voltage. A ripple voltage ($V_{ripple}$) present on the input voltage causes a ripple current ($I_{ripple}$) which generates a corresponding ripple voltage on the gate of the pass transistor (MN1). An N-channel cancellation transistor (MN3) coupled between the supply voltage and the regulated output voltage produces a first current ($I_{fraction}$) proportional to the ripple current. The gate of the cancellation transistor is biased to the gate voltage of the pass transistor. The first current is multiplied to generate a cancellation current ($I_{cancel}$) in the first conductor equal and opposite to the ripple current to cancel it to prevent the generation of the ripple voltage on the gate of the pass transistor (MN1) and to prevent it from being passed onto the regulated output voltage.

In one embodiment, the invention provides a low dropout (LDO) voltage regulator (10) having a supply voltage input (5,$V_{IN}$) and a regulated voltage output (6,$V_{OUT}$), including an error amplifier (2) having an output connected to a first conductor (15), an N-channel pass transistor (MN1) having a drain coupled to the supply voltage input (5,$V_{IN}$), a source coupled to the regulated voltage output (6,$V_{OUT}$), and a gate coupled to the first conductor (15), the error amplifier (2) having a first input (+) coupled to a reference voltage ($V_{REF}$) and a second input (−) coupled via a feedback path (4,R1, R2) to the regulated voltage output (6,$V_{OUT}$), a ripple voltage signal ($V_{ripple}$) present on the supply voltage input (5,$V_{IN}$) producing a ripple current ($I_{ripple}$) which tends to flow into an output impedance ($r_o$) of the error amplifier (2) and generate a corresponding ripple voltage on the gate of the pass transistor (MN1); an N-channel cancellation transistor (MN3) coupled between the supply voltage input (5,$V_{IN}$) and the regulated voltage output (6,$V_{OUT}$) and having a gate coupled to a second conductor (20), for producing an AC injection cancellation current ($I_{fraction}$) which is a predetermined proportion of the ripple current ($I_{ripple}$); biasing circuitry (18) coupled between the first conductor (15) and the second conductor (20) for biasing the gate of the N-channel cancellation transistor (MN3) at a voltage having a predetermined relationship to a voltage on the first conductor (15); an AC current gain circuit (7); and circuitry (Q3) for coupling the second conductor (20) to an input (21) of the AC current gain circuit (7), the AC current gain circuit (7) having an output coupled to the first conductor (15) and operating to multiply the AC injection cancellation current ($I_{fraction}$) sufficiently to generate a ripple cancellation current ($I_{cancel}$) substantially equal to the ripple current ($I_{ripple}$) in a direction opposite to the ripple current ($I_{ripple}$) to cancel the ripple current ($I_{ripple}$) in the first conductor (15) so as to prevent the ripple current ($I_{ripple}$) from flowing into the output impedance ($r_o$) of the error amplifier (2).

In one embodiment, the predetermined proportion of the ripple current ($I_{ripple}$) is 1 percent and the gain of the AC current gain circuit (7) is 100.

In one embodiment, the AC current gain circuit (7) includes a first current mirror circuit (7A) having an input ($I_{fraction}$) coupled to the input (21) of the AC current gain circuit (7) and an output (I2) coupled to an input (I3) of a second current mirror circuit (7B), the second current mirror circuit (7B) having an output ($I_{cancel}$) coupled to the first conductor (15).

In one embodiment, the biasing circuitry (18) includes a first voltage follower (Q4,16) having an input coupled to the first conductor (15) and a second voltage follower (Q4,14) having an input (19) coupled to an output of the first voltage follower (Q4,16).

In one embodiment, the first voltage follower circuit (Q4,16) includes an NPN transistor (Q4) having a collector coupled to a first reference voltage ($V_{DD}$), a base coupled to the first conductor (15), and wherein the second voltage follower (Q3,14) includes a PNP transistor (Q3) having an emitter coupled to the second conductor (20) and a second current source (14), a base coupled to an emitter of the NPN transistor (Q4), and a collector coupled to the input (21) of the AC current gain circuit (7). In one embodiment, the coupling circuitry (Q3) includes the PNP transistor (Q3).

In one embodiment, the feedback path (4,R1,R2) includes a first resistor (R2) coupled between the second input (−) of the error amplifier (2) and a second reference voltage (GND) and a second resistor (R1) coupled between the second input (−) of the error amplifier (2) and the regulated voltage output (6,$V_{OUT}$).

In one embodiment, the first current mirror circuit (7A) includes an NPN input transistor (Q12) having a collector coupled to the input (21) of the AC current gain circuit (7)

and a gate of an N-channel transistor (MN0), an emitter coupled to the second reference voltage (GND), and a base coupled to a base of an NPN output transistor (Q11) and a source of the N-channel transistor (MN0), the NPN output transistor (Q11) having an emitter coupled to the second reference voltage (GND) through both a third resistor (R21) and a first capacitor (C0) and a collector coupled to an input of a current mirror (MP1,MP0) including an output coupled to the input (I3). In one embodiment, the second current mirror circuit (7B) is substantially similar to the first current mirror circuit (7A).

In one embodiment, the biasing circuitry (18) includes a buffer circuit (18). In one embodiment, the biasing circuitry (18) biases the gate of the N-channel cancellation transistor (MN3) to a voltage which is equal to the voltage on the first conductor (15) and the gate of the pass transistor (MN1).

In one embodiment, the predetermined proportion of the ripple current ($I_{ripple}$) is in the range from approximately 1 percent to approximately 2 percent.

In one embodiment, the invention provides a method for canceling the effect of a ripple voltage present on a supply voltage input (5,$V_{IN}$) from a regulated voltage output (6,$V_{OUT}$) of a low dropout (LDO) voltage regulator, the method including providing an error amplifier (2) having an output connected to a first conductor (15), an N-channel pass transistor (MN1) having a drain coupled to the supply voltage input (5,$V_{IN}$), a source coupled to the regulated voltage output (6,$V_{OUT}$), and a gate coupled to the first conductor (15), the error amplifier (2) having a first input (+) coupled to a reference voltage ($V_{REF}$) and a second input (−) coupled via a feedback path (4,R1,R2) to the regulated voltage output (6,$V_{OUT}$), a ripple voltage signal ($V_{ripple}$) present on the supply voltage input (5,$V_{IN}$) producing a ripple current ($I_{ripple}$) which tends to flow into an output impedance ($r_o$) of the error amplifier (2) and generate a corresponding ripple voltage on the gate of the pass transistor (MN1); coupling an N-channel cancellation transistor (MN3) between the supply voltage input (5,$V_{IN}$) and the regulated voltage output (6,$V_{OUT}$) and coupling a gate of the N-channel cancellation transistor (MN3) to a second conductor (20), for producing an AC injection cancellation current ($I_{fraction}$) which is a predetermined proportion of the ripple current ($I_{ripple}$); biasing the gate of the N-channel cancellation transistor (MN3) at a voltage that is substantially equal to the voltage of the first conductor (15); and multiplying the AC injection cancellation current ($I_{fraction}$) sufficiently to generate a ripple cancellation current ($I_{cancel}$) in the first conductor (15) substantially equal to the ripple current ($I_{ripple}$) in a direction opposite to the ripple current ($I_{ripple}$) to cancel the ripple current ($I_{ripple}$) in the first conductor (15) so as to prevent the ripple current ($I_{ripple}$) from flowing into the output impedance ($r_o$) of the error amplifier (2) and causing a ripple voltage to be coupled onto the regulated voltage output (6,$V_{OUT}$).

In one embodiment the method includes providing biasing circuitry (18) including a first voltage follower (Q4,16) having an input coupled to the first conductor (15) and a second voltage follower (Q4,14) having an input (19) coupled to an output of the first voltage follower (Q4,16) and an output coupled to the first conductor (15).

In one embodiment, the first voltage follower circuit (Q4,16) includes an NPN transistor (Q4) having a collector coupled to a first reference voltage ($V_{DD}$), a base coupled to the first conductor (15) and an emitter coupled to a first current source (16), and wherein the second voltage follower (Q3,14) includes a PNP transistor (Q3) having an emitter coupled to the second conductor (20) and a second current source (14), a base coupled to the emitter of the NPN transistor (Q4), and a collector coupled to the input (21) of the AC current gain circuit (7), and the method includes causing the AC injection cancellation current ($I_{fraction}$) to flow through the PNP transistor (Q3) into an input (21) of an AC current gain circuit (7) having an output coupled to the first conductor (15).

In one embodiment, the method includes providing the predetermined proportion of the ripple current ($I_{ripple}$) as 1 percent and the gain of the AC current gain circuit (7) as 100.

In one embodiment the method includes performing the multiplying by means of current mirror circuitry (7A,7B).

In one embodiment, the invention provides a circuit for canceling the effect of a ripple voltage present on a supply voltage input (5,$V_{IN}$) from a regulated voltage output (6,$V_{OUT}$) of a low dropout (LDO) voltage regulator, including an error amplifier (2) having an output connected to a first conductor (15), an N-channel pass transistor (MN1) having a drain coupled to the supply voltage input (5,$V_{IN}$), a source coupled to the regulated voltage output (6,$V_{OUT}$), and a gate coupled to the first conductor (15), the error amplifier (2) having a first input (+) coupled to a reference voltage ($V_{REF}$) and a second input (−) coupled via a feedback path (4,R1,R2) to the regulated voltage output (6,$V_{OUT}$), a ripple voltage signal ($V_{ripple}$) present on the supply voltage input (5,$V_{IN}$) producing a ripple current ($I_{ripple}$) which tends to flow into an output impedance ($r_o$) of the error amplifier (2) and generates a corresponding ripple voltage on the gate of the pass transistor (MN1); means (MN3) for producing an AC injection cancellation current ($I_{fraction}$) which is a predetermined proportion of the ripple current ($I_{ripple}$); means (Q4,Q3) for biasing the gate of the N-channel cancellation transistor (MN3) at a voltage that is substantially equal to the voltage of the first conductor (15); and means (7) for multiplying the AC injection cancellation current ($I_{fraction}$) sufficiently to generate a ripple cancellation current ($I_{cancel}$) in the first conductor (15) substantially equal to the ripple current ($I_{ripple}$) in a direction opposite to the ripple current ($I_{ripple}$) to cancel the ripple current ($I_{ripple}$) in the first conductor (15) so as to prevent the ripple current ($I_{ripple}$) from flowing into the output impedance ($r_o$) of the error amplifier (2) and causing a ripple voltage to be coupled onto the regulated voltage output (6,$V_{OUT}$).

DETAILED DESCRIPTION OF THE PREFERRED EMBODIMENTS

Figure 2:
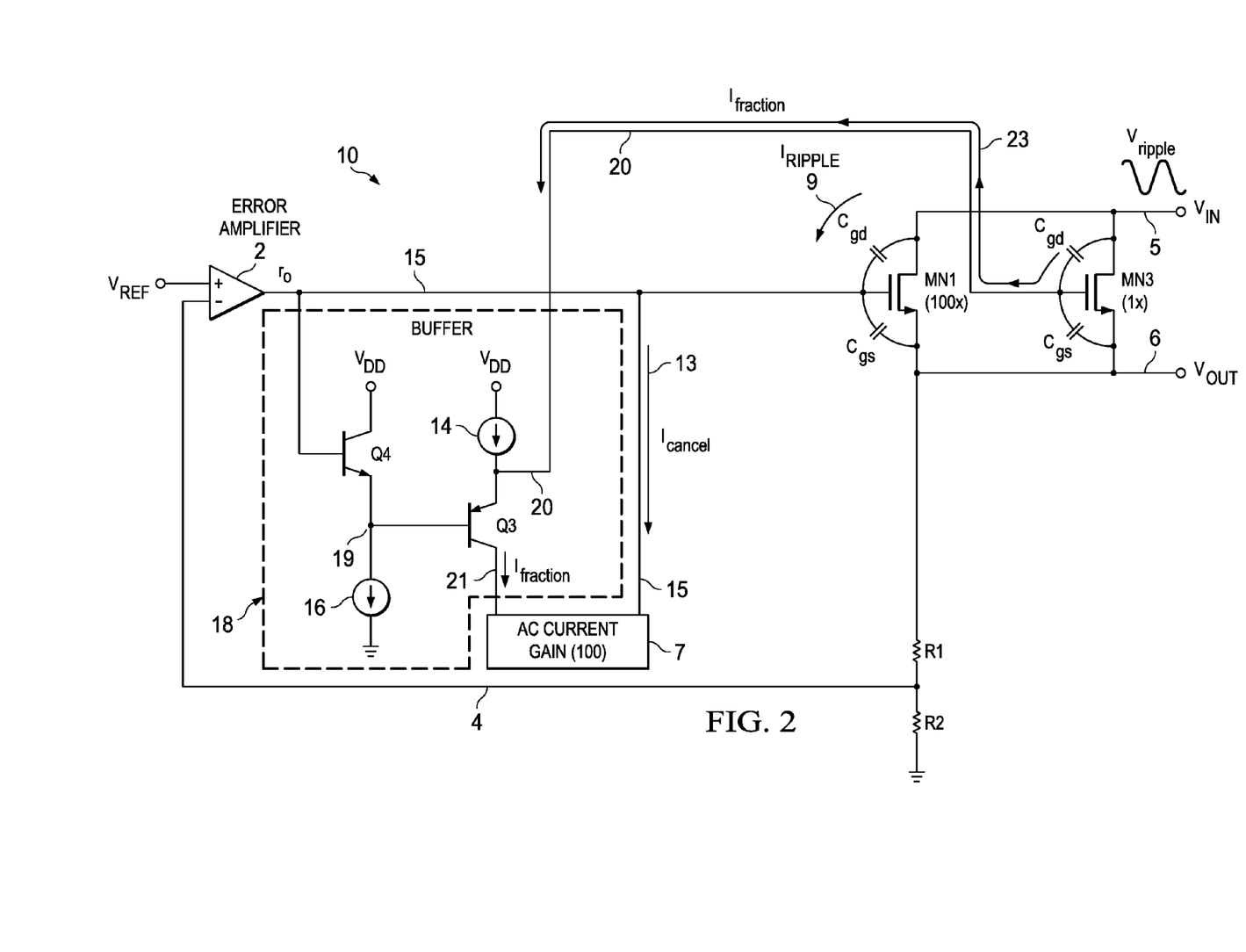
FIG. 2 is a schematic diagram of an LDO voltage regulator utilizing an N-channel pass transistor which achieves power supply ripple or noise cancellation irrespective of whether the pass transistor is in its linear operating region.

Referring to FIG. 2, a low-dropout (LDO) voltage regulator 10 includes an error amplifier 2 and a large N-channel pass transistor MN1 having its drain connected by input conductor 5 to the unregulated noisy power supply input voltage $V_{IN}$. The source of pass transistor MN1 is connected to the output conductor 6 on which the regulated output voltage $V_{OUT}$ is generated. (Note that the source and drain connections of N-channel pass transistor MN1 in FIG. 2 are opposite to the source and drain connections of the P-channel pass transistors shown in Prior Art FIGS. 1B and 1C.) The (+) input of error amplifier 2 is coupled to a reference voltage $V_{REF}$, which typically is generated by a conventional band gap reference circuit. A resistive voltage divider circuit including feedback resistors R1 and R2 feeds the scaled-down regulated output voltage $V_{OUT}$ on conductor 6 back via conductor 4 to the (−) input of error amplifier 2. The output of error amplifier 2 is coupled by conductor 15 to drive the gate of N-channel MOS pass transistor MN1, which functions as a source follower and therefore causes output voltage $V_{OUT}$ to "follow" $V_{REF}$ according to the feedback voltage on conductor 4 applied to the (−) input of error amplifier 2 by resistive voltage divider R1,R2.

An N-channel MOS ripple or noise voltage cancellation transistor MN3 has its source connected to $V_{OUT}$ conductor 6, its drain connected to $V_{IN}$ conductor 5, its source connected to $V_{OUT}$, and its gate connected to conductor 20. A biasing or buffer circuit 18 has an input connected by conductor 15 to the output of error amplifier 2 and an output connected by conductor 20 to the gate of ripple cancellation transistor MN3. Biasing circuitry 18 operates to maintain the voltage on the gate of ripple voltage cancellation transistor MN3 essentially equal to the gate voltage of pass transistor MN1. in this example, biasing or buffer circuitry 18 includes a first emitter follower circuit including NPN transistor Q4 having its collector connected to $V_{DD}$, its base connected to conductor 15, and its emitter connected by conductor 19 to a current source 16. Biasing or buffer circuit 18 also includes a second emitter follower including a PNP transistor Q3 having its emitter connected to conductor 20, its base connected to conductor 19, and its collector connected to conductor 21, which is the input of an AC current gain circuit 7. The emitter of PNP transistor Q3 is also connected to a current source 14. In this example, the channel-width-to-channel-length ratio of pass transistor MN1 is 100 times that of cancellation transistor MN3. The output of AC current gain circuit 7 is connected to error amplifier output conductor 15 and the gate of pass transistor MN1. The collector of NPN level shift transistor Q4 is connected to a high voltage rail such as $V_{DD}$ or a charge-pumped voltage rail $V_{CP}$. (It should be noted that the biasing or buffer circuit 18 could be implemented in various other ways.)

As in the LDO regulator shown in Prior Art FIG. 1A, since error amplifier 2 in FIG. 2 has finite output impedance $r_o$, the "displacement current" $I_{ripple}$ injected into the gate of pass transistor MN1 through its gate-to-drain parasitic capacitance Cgd (as a result of an AC ripple voltage component $V_{ripple}$ of the "power supply" input voltage $V_{IN}$) flows through the output resistance or impedance $r_o$ of error amplifier 2, effectively causing a ripple voltage related to $V_{ripple}$ on the gate of pass transistor MN1. Since pass transistor MN1 functions as a source follower, the ripple voltage on the gate of pass transistor MN1 will be passed onto output conductor 6 and the regulated output voltage $V_{OUT}$, resulting in the degradation of the PSRR (power supply rejection ratio or power supply ripple rejection) of LDO voltage regulator 10, especially at high frequencies.

In the example of FIG. 2, arrow 9 indicates the flow of the "injected" power supply ripple current $I_{ripple}$ caused by $V_{ripple}$ through the parasitic gate-drain capacitance Cgd. Similarly, $V_{ripple}$ causes a scaled-down current $I_{fraction}$, which is equal to 1% (in this example) of the injected AC ripple current $I_{ripple}$, to flow through the gate-to-drain capacitance Cgd of cancellation transistor MN3 into conductor 20, through transistor Q3 and conductor 21 into an input of AC current gain circuit 7 (which in this example has an AC gain of 100). Consequently, the output of AC current gain circuit 7 is a ripple cancellation current $I_{cancel}$, which is equal to $I_{ripple}$ but in the opposite direction to $I_{ripple}$. The flow of $I_{cancel}$ out of conductor 15 is indicated by arrow 13, so the net flow of the currents $I_{ripple}$ and $I_{cancel}$ into conductor 15 and error amplifier output impedance $r_o$ is zero. Therefore, none of the injected AC displacement current $I_{ripple}$ caused by $V_{ripple}$ actually flows through the output resistance $r_o$ of error amplifier 2. This results in a substantial improvement of the PSRR of regulator 10 that is relatively independent of various circuit parameters and also is relatively independent of whether pass transistor MN1 is close to or in its linear/triode region even at high frequencies beyond the bandwidth of the LDO feedback loop.

The gain of AC current gain circuit 7 preferably is in the range from roughly 50 to 100. The channel-width-to-channel-length of ripple cancellation transistor MN3 should be in such a ratio with pass transistor MN1 that $I_{cancel}$, which is gained up from the AC injection current $I_{fraction}$, exactly cancels $I_{ripple}$.

The purpose of emitter follower transistors Q4 and Q3 is to duplicate the voltage of the gate of pass transistor MN1 onto the gate of cancellation transistor MN3 so that transistors MN1 and MN3 are biased the same in order to maintain a constant ratio between their respective displacement currents. Ripple cancellation transistor MN3 delivers current to an output, so it needs to be controlled with sufficiently high speed that cancellation transistor MN3 will not cause appreciable overshooting and undershooting in $V_{OUT}$ during fast transients. The emitter follower transistors Q3 and Q4 function well for this purpose as high-speed voltage followers. Any discrepancy between the voltages on the gates of pass transistor MN1 and cancellation transistor MN3 results in MN3 and MN1 operating at different points, causing errors in the ratio between the two displacement currents. The larger the voltage discrepancy, the larger the error in the ratio between the two displacement currents, and therefore the less effective the ripple current cancellation will be.

An optimal design of level shifting emitter follower transistors Q3 and Q4 (or other suitable buffer circuitry) should cause the impedance on conductor 20 to be exactly 100 times the impedance on conductor 15, but in practice this is not easy to achieve. However, if the impedances on nodes 20 and 15 are made small enough, then the impedance mismatch between conductors 15 and 20 is no longer critical. The impedance of node 20 is actually the emitter impedance of level shift transistor Q3, and therefore it can be made sufficiently small by increasing the biasing current in current source 14 shown in FIG. 2.

In some cases, the reduction of $I_{fraction}$ by the amount of the base current of emitter follower transistor Q4 may have an undesirable effect on the cancellation of $I_{ripple}$ by $I_{cancel}$. In fact, the residual current $I_{cancel}-I_{ripple}$ from the cancellation can be calculated as $1/(1+\beta) \times I_{ripple}$ where β is equal to the collector current of transistor Q4 divided by its base current. As long as β is greater than 9, an increase of more than 20 dB can be achieved for PSRR. In integrated circuit manufacturing processes wherein the transistor β is relatively low, CMOS buffer circuits can be used to replace emitter follower transistors Q4 and Q3 to keep the voltage on the gate (conductor 20) of ripple cancellation transistor MN3 to be the same as or very close to the voltage on the gate (conductor 15) of pass transistor MN1.

Error amplifier 2 should be powered by a voltage that is sufficiently high to supply gate drive for pass transistor MN1. As previously indicated, for low headroom voltage (V-to-$V_{OUT}$ voltage) applications, $V_{IN}$ is too low and the supply voltage may be provided from an extra external source $V_{DD}$ or from an internal charge pump $V_{CP}$.

Figure 3:
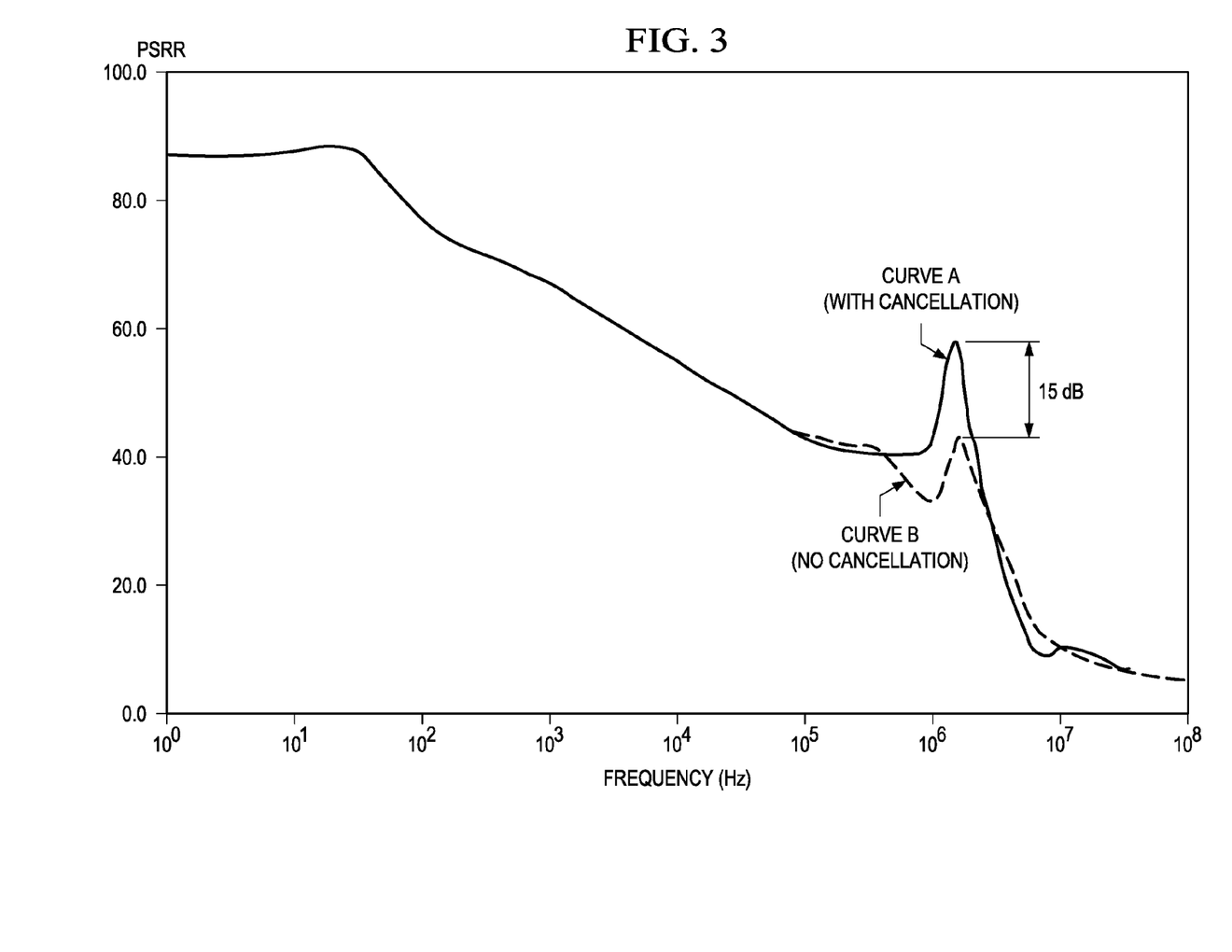
FIG. 3 is a graph illustrating PSRR simulation curves of an LDO voltage regulator utilizing an N-channel pass transistor as in FIG. 2 with and without the power supply ripple/noise cancellation circuitry, respectively.

In the PSRR versus frequency graph shown in FIG. 3, curve A indicates the PSRR for LDO voltage regulator 10 of FIG. 2 with the power supply noise cancellation circuitry operative. Curve B indicates the PSRR for the same LDO voltage regulator if the power supply noise cancellation circuitry including transistors MN3, Q3, and Q4 and AC current gain circuit 7 are not operative. The power ripple or noise voltage on $V_{IN}$ can be passed to $V_{OUT}$ through various paths, depending on the LDO regulator topology. It can be seen that the $V_{IN}$ ripple or noise voltage disturbance is greatly suppressed by the large loop gain of the LDO at DC and low frequencies. The PSRR shows the roll-off behavior of −20 dB per decade as the frequency increases and passes beyond the dominant pole, similar to the roll-off behavior of the loop gain of the LDO regulator of FIG. 2. After the frequency increases beyond the unity gain frequency, which is about 1 MHz in one implementation of the described design, the LDO feedback loop loses it capability to suppress the ripple/noise disturbance and the output load capacitance (not shown) plays a dominant role in the ripple/noise voltage suppression. It can be seen that there is no substantial difference between curves A and B at DC and low frequencies. In curve A, a peak value of PSRR approximately 15 dB above a corresponding peak value in curve B occurs at a high frequency of roughly 2 MHZ (in this example), indicating that the cancellation helps suppress the high-frequency power supply noise beyond the unity gain frequency of the LDO loop.

The foregoing ripple/noise cancellation circuitry in FIG. 3 is in contrast to the prior art power supply ripple cancellation circuitry indicated in Prior Art FIGS. 1B and 1C, both of which only improve the PSRR within a range of frequencies that are mainly determined by the LDO feedback loop. None of the known prior art LDO voltage regulators includes a ripple cancellation transistor such as MN3 coupled between the LDO input and output terminals to generate a scaled-down replica of the injected ripple current which is gained back up to the same scale to nullify the injected ripple current at the gate of the pass transistor.

Figure 4:
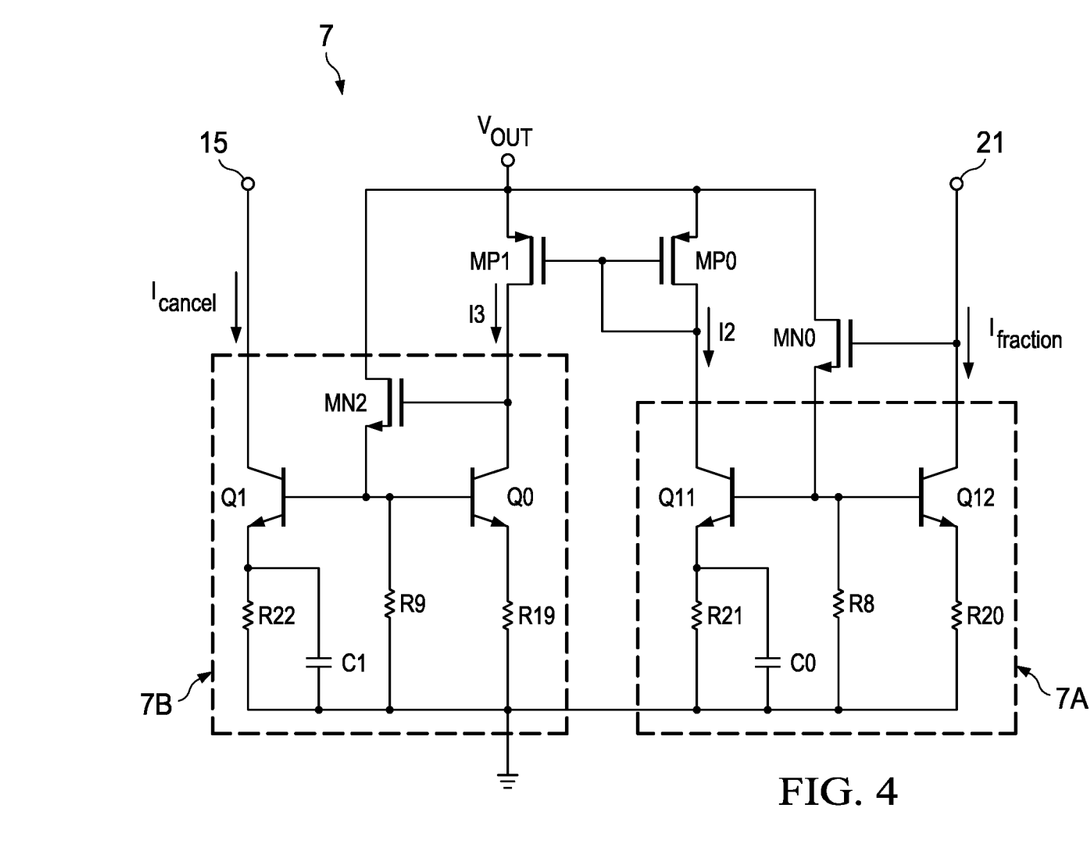
FIG. 4 is a detailed circuit schematic of the current gain block 7 in FIG. 2.

FIG. 4 shows a schematic diagram of AC current gain circuit 7 of FIG. 2. In this example, AC current gain circuit 7 includes two current mirror circuits 7A and 7B. Current mirror circuit 7A includes an NPN current mirror input transistor Q12 having its collector connected to conductor 21 to receive the bias current from current source 14 and the "injected" ripple current $I_{fraction}$ in FIG. 2. The emitter of transistor Q12 is coupled to ground through resistor R20 and its base is connected to the base of an identical NPN transistor Q11. The emitter of current mirror output transistor Q11 is connected to one terminal of resistor R21 and one terminal of capacitor C0. The other terminal of each of resistor R21 and capacitor C0 is connected to ground. R21 matches R20, i.e., R21=R20=R. The drain of transistor MN0 preferably is connected to $V_{OUT}$ for even better PSRR performance (although any voltage, such as $V_{DD}$ may be used). The bases of current mirror transistors Q11 and Q12 are connected to the source of an N-channel MOS transistor MN0 and one terminal of a bias resistor R8, the other terminal of which is connected to ground. Transistors MN0 and Q12 together function as a diode-connected NPN current mirror input transistor. The collector of current mirror output transistor Q11 is connected to the drain and gate of a P-channel current mirror input transistor MP0 and to the gate of a P-channel current mirror output transistor MP1, the sources of which are connected to $V_{OUT}$. A current I2 generated by transistor Q11 flows through current mirror input transistor MP0, generating a drain current I3 in the P-channel current mirror output transistor MP1, which drives current mirror circuit 7B. It can be shown using small signal analysis that the impedance seen by $I_{fraction}$ is equal to $1/g_m+R$ and the small signal voltage on the bases of transistors Q12 and Q11 is equal to $(1/g_m+R) \times I_{fraction}$, where $g_m=Ic/V_T$ is the transconductance for all of the bipolar transistors and $V_T$ is the thermal voltage kT/q. At DC, capacitor C0 has no effect and Q11 and R21 is identical to Q12 and R20, and therefore the DC value of I2 is equal to the current of current source 14 as shown in FIG. 2. As the frequency of operation becomes higher and higher, eventually the impedance of capacitor C0 becomes dominant over the resistance of resistor R21, causing the AC value of I2 to increase relative to $I_{fraction}$. If the frequency becomes very large, then capacitor C0 in effect becomes a short circuit and the degeneracy for Q11 becomes 0, the effective transconductance of the current source of Q11 with degeneracy of C0 and R21 becomes $g_m$, and therefore $I2=I_{fraction} \times (1+g_mR)$. In the described design, $1+g_mR$ is chosen to be 10, so circuit 7A has a current gain of 10 at high frequencies.

The output current I2 of current mirror circuit 7A is mirrored by P-channel transistors MP0 and MP1 to produce the input current I3 for the second essentially identical current mirror circuit 7B, to provide cancellation current $I_{cancel}$ as shown in FIG. 2. Similarly, current mirror circuit 7B includes an NPN input transistor Q0 having its collector connected to the drain of current mirror output transistor MP1 to receive the current I3, which is an identical replica of I2. The emitter of transistor Q0 is coupled to ground through resistor R19 and its base is connected to the base of NPN current mirror output transistor Q1. The emitter of current mirror output transistor Q1 is connected to one terminal of each of resistor R22 and capacitor C1. The other terminals of each of resistor R22 and capacitor C1, respectively, are connected to ground. In this design R19=R22=R20=R21=R, and C1=C0=C. The bases of current mirror transistors Q0 and Q1 are connected to the source of an N-channel MOS transistor MN2 and one terminal of a bias resistor R9, the other terminal of which is connected to ground. The collector of current mirror output transistor Q1 produces cancellation current $I_{cancel}$ and is connected to conductor 15 of FIG. 2. Just like what has been derived for current mirror 7A, it can be shown that the current gain of $I_{cancel}$ to I3 is equal to 1 at DC, i.e., $I_{cancel}$, I3, and I2 are all the same as the current of current source 14 in FIG. 2 at DC. At high frequencies, the current gain of $I_{cancel}$ to I3 becomes $(1+g_mR)$, which is 10 in this design. Therefore, the overall current gain of $I_{cancel}$ to $I_{fraction}$ is given by the product of gains of current mirror circuits 7A and 7B, which is equal to 1 at DC, and 100 at high frequencies. Since the current gain of current gain circuit 7 is equal to 1 at DC, it causes no significant loading on error amplifier 2.

An important advantage of the described embodiment of the invention is that the cancellation operation is substantially independent of whether the N-channel pass transistor is operating in or near its linear operating region.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, the bipolar level shift circuit including transistor Q3 driving the gate of cancellation transistor MN3 can be implemented in various ways. In some cases, it may be practical and advantageous for the pass transistor and cancellation transistor to be bipolar NPN transistors or N-channel JFETs (junction field effect transistors). By way of definition, the terms "gate", "source", and "drain" as used herein pertaining to a field effect transistor are intended to encompass the base, emitter, and collector of bipolar transistors if they are utilized as pass transistors and ripple cancellation transistors.

What is claimed is:

1. A low dropout (LDO) voltage regulator having a supply voltage input and a regulated voltage output, comprising:
    an error amplifier having an output connected to a first conductor, an N-channel pass transistor having a drain coupled to the supply voltage input, a source coupled to the regulated voltage output, and a gate coupled to the first conductor, the error amplifier having a first input coupled to a reference voltage and a second input coupled via a feedback path to the regulated voltage output, a ripple voltage signal present on the supply voltage input producing a ripple current which tends to flow into an output impedance of the error amplifier and generate a corresponding ripple voltage on the gate of the pass transistor;
    an N-channel cancellation transistor having a drain coupled to the supply voltage input and a source coupled to the regulated voltage output and having a gate coupled to a second conductor distinct from the first conductor, for producing an AC injection cancellation current which is a predetermined proportion of the ripple current;
    biasing circuitry coupled between the first conductor and the second conductor for biasing the gate of the N-channel cancellation transistor at a voltage having a predetermined relationship to a voltage on the first conductor;
    an AC current gain circuit; and
    circuitry for coupling the second conductor to an input of the AC current gain circuit, the AC current gain circuit having an output coupled to the first conductor and operating to multiply the AC injection cancellation current sufficiently to generate a ripple cancellation current substantially equal to the ripple current in a direction opposite to the ripple current to cancel the ripple current in the first conductor so as to prevent the ripple current from flowing into the output impedance of the error amplifier, wherein the power supply rejection ratio (PSRR) of the LDO regulator is improved.

2. The low dropout voltage regulator of claim 1 wherein the predetermined proportion of the ripple current is 1 percent.

3. The low dropout voltage regulator of claim 2 wherein the gain of the AC current gain circuit is 100.

4. The low dropout voltage regulator of claim 1 wherein the AC current gain circuit includes a first current mirror circuit having an input coupled to the input of the AC current gain circuit and an output coupled to an input of a second current mirror circuit, the second current mirror circuit having an output coupled to the first conductor.

5. The low dropout voltage regulator of claim 4 wherein the first current mirror circuit includes an NPN input transistor having a collector coupled to the input of the AC current gain circuit and a gate of an N-channel transistor, an emitter coupled to the second reference voltage, and a base coupled to a base of an NPN output transistor and a source of the N-channel transistor, the NPN output transistor having an emitter coupled to the second reference voltage through both a third resistor and a first capacitor and a collector coupled to an input of a current mirror including an output coupled to the input.

6. The low dropout voltage regulator of claim 5 wherein the second current mirror circuit is substantially similar to the first current mirror circuit.

7. The low dropout voltage regulator of claim 1 wherein the biasing circuitry includes a first voltage follower having an input coupled to the first conductor and a second voltage follower having an input coupled to an output of the first voltage follower.

8. The low dropout voltage regulator of claim 7 wherein the first voltage follower circuit includes an NPN transistor having a collector coupled to a first reference voltage, a base coupled to the first conductor, and wherein the second voltage follower includes a PNP transistor having an emitter coupled to the second conductor and a second current source, a base coupled to an emitter of the NPN transistor, and a collector coupled to the input of the AC current gain circuit.

9. The low dropout voltage regulator of claim 8 wherein the coupling circuitry includes the PNP transistor.

10. The low dropout voltage regulator of claim 9 wherein the feedback path includes a first resistor coupled between the second input of the error amplifier and a second reference voltage and a second resistor coupled between the second input of the error amplifier and the regulated voltage output.

11. The low dropout voltage regulator of claim 1 wherein the biasing circuitry includes a buffer circuit.

12. The low dropout voltage regulator of claim 1 wherein the predetermined proportion of the ripple current is in the range from approximately 1 percent to approximately 2 percent.

13. The low dropout voltage regulator of claim 1 wherein the biasing circuitry biases the gate of the N-channel cancellation transistor to a voltage which is equal to the voltage on the first conductor and the gate of the pass transistor.

14. A method for canceling the effect of a ripple voltage present on a supply voltage input from a regulated voltage output of a low dropout (LDO) voltage regulator, the method comprising:
    providing an error amplifier having an output connected to a first conductor, an N-channel pass transistor having a drain coupled to the supply voltage input, a source coupled to the regulated voltage output, and a gate coupled to the first conductor, the error amplifier having a first input coupled to a reference voltage and a second input coupled via a feedback path to the regulated voltage output, a ripple voltage signal present on the supply voltage input producing a ripple current which tends to flow into an output impedance of the error amplifier and generate a corresponding ripple voltage on the gate of the pass transistor;

coupling a drain of an N-channel cancellation transistor to the supply voltage input and a source coupled to the regulated voltage output and coupling a gate of the N-channel cancellation transistor to a second conductor distinct from the first conductor, for producing an AC injection cancellation current which is a predetermined proportion of the ripple current;

biasing the gate of the N-channel cancellation transistor at a voltage that is substantially equal to the voltage of the first conductor; and multiplying the AC injection cancellation current sufficiently to generate a ripple cancellation current in the first conductor substantially equal to the ripple current in a direction opposite to the ripple current to cancel the ripple current in the first conductor so as to prevent the ripple current from flowing into the output impedance of the error amplifier and from thereby causing a ripple voltage to be coupled onto the regulated voltage output, wherein the power supply rejection ratio (PSRR) of the LDO regulator is improved.

15. The method of claim 14 wherein step (c) includes providing biasing circuitry including a first voltage follower having an input coupled to the first conductor and a second voltage follower having an input coupled to an output of the first voltage follower and also having an output coupled to the first conductor.

16. The method of claim 15 wherein the first voltage follower circuit includes an NPN transistor having a collector coupled to a first reference voltage, a base coupled to the first conductor and an emitter coupled to a first current source, and wherein the second voltage follower includes a PNP transistor having an emitter coupled to the second conductor and a second current source, a base coupled to the emitter of the NPN transistor, and a collector coupled to the input of the AC current gain circuit, the method including causing the AC injection cancellation current to flow through the PNP transistor into an input of an AC current gain circuit having an output coupled to the first conductor.

17. The method of claim 16 wherein the predetermined proportion of the ripple current is 1 percent and the gain of the AC current gain circuit is 100.

18. The method of claim 15 including performing the multiplying by means of current mirror circuitry.

19. A circuit for canceling the effect of a ripple voltage present on a supply voltage input from a regulated voltage output of a low dropout (LDO) voltage regulator, comprising:

an error amplifier having an output connected to a first conductor, an N-channel pass transistor having a drain coupled to the supply voltage input, a source coupled to the regulated voltage output, and a gate coupled to the first conductor, the error amplifier having a first input coupled to a reference voltage and a second input coupled via a feedback path to the regulated voltage output, a ripple voltage signal present on the supply voltage input producing a ripple current which tends to flow into an output impedance of the error amplifier and generate a corresponding ripple voltage on the gate of the pass transistor;

means including an N-channel cancellation transistor having a drain coupled between the supply voltage input and a source coupled to the regulated voltage output and having a gate coupled to a second conductor distinct from the first conductor for producing an AC injection cancellation current which is a predetermined proportion of the ripple current;

means for biasing the gate of the N-channel cancellation transistor at a voltage that is substantially equal to the voltage of the first conductor; and means for multiplying the AC injection cancellation current sufficiently to generate a ripple cancellation current in the first conductor substantially equal to the ripple current in a direction opposite to the ripple current to cancel the ripple current in the first conductor so as to prevent the ripple current from flowing into the output impedance of the error amplifier and from thereby causing a ripple voltage to be coupled onto the regulated voltage output, wherein the power supply rejection ratio (PSRR) of the LDO regulator is improved.

* * * * *